United States Patent
Hussain et al.

(10) Patent No.: US 9,086,307 B2
(45) Date of Patent: Jul. 21, 2015

(54) CORIOLIS MASS FLOWMETER

(71) Applicant: Krohne AG, Basel (CH)

(72) Inventors: Yousif Hussain, Weston Favell (GB); Christopher Rolph, Hartwell (GB)

(73) Assignee: Krohne AG, Basel (CH)

( * ) Notice: Subject to any disclaimer, the term of this patent is extended or adjusted under 35 U.S.C. 154(b) by 70 days.

(21) Appl. No.: 13/731,813

(22) Filed: Dec. 31, 2012

(65) Prior Publication Data

US 2014/0083204 A1 Mar. 27, 2014

(30) Foreign Application Priority Data

Sep. 27, 2012 (DE) .......... 10 2012 018 988

(51) Int. Cl.
*G01F 1/84* (2006.01)

(52) U.S. Cl.
CPC ............ *G01F 1/8472* (2013.01); *G01F 1/8409* (2013.01); *G01F 1/8477* (2013.01)

(58) Field of Classification Search
CPC ... G01F 1/8472; G01F 1/8413; G01F 1/8477; G01F 1/8409
USPC ...................... 73/861.354–861.357
See application file for complete search history.

(56) References Cited

U.S. PATENT DOCUMENTS

| 5,301,557 | A | 4/1994 | Cage et al. | |
|---|---|---|---|---|
| 5,323,658 | A * | 6/1994 | Yao et al. | 73/861.357 |
| 6,564,650 | B2 | 5/2003 | Ollila et al. | |
| 6,776,052 | B2 | 8/2004 | Crisfield et al. | |
| 6,957,587 | B2 * | 10/2005 | Bitto et al. | 73/861.355 |
| 7,216,549 | B2 | 5/2007 | Rieder et al. | |
| 7,506,551 | B2 | 3/2009 | Kitami | |
| 2005/0039547 | A1 * | 2/2005 | Bitto et al. | 73/861.355 |
| 2006/0150750 | A1 * | 7/2006 | Anklin-Imhof et al. | 73/861.357 |
| 2007/0151369 | A1 * | 7/2007 | Bitto et al. | 73/861.357 |
| 2009/0235759 | A1 * | 9/2009 | Bitto et al. | 73/861.355 |
| 2009/0266177 | A1 * | 10/2009 | Hussain et al. | 73/861.357 |
| 2011/0023624 | A1 * | 2/2011 | Huber et al. | 73/861.357 |
| 2011/0259121 | A1 | 10/2011 | Kolahi et al. | |
| 2011/0259124 | A1 * | 10/2011 | Hussain et al. | 73/861.357 |
| 2012/0042732 | A1 * | 2/2012 | Zhu et al. | 73/861.18 |
| 2012/0123705 | A1 * | 5/2012 | Drahm et al. | 73/861.19 |
| 2012/0167697 | A1 * | 7/2012 | Rieder et al. | 73/861.357 |
| 2012/0192658 | A1 * | 8/2012 | Hussain et al. | 73/861.357 |

FOREIGN PATENT DOCUMENTS

| DE | 38 24 351 A1 | 1/1990 |
|---|---|---|
| DE | 10 2005 056 164 A1 | 5/2007 |
| WO | 2012/005735 A1 | 1/2012 |

* cited by examiner

*Primary Examiner* — Lisa Caputo
*Assistant Examiner* — Philip Cotey
(74) *Attorney, Agent, or Firm* — Roberts Mlotkowski Safran & Cole, P.C.; David S. Safran

(57) ABSTRACT

A Coriolis mass flowmeter (1) having at least one curved measuring tube (2), at least one oscillation generator (3), at least one oscillation sensor (4), at least one measuring device electronics (5) and a housing (6). To provide the housing (6) with increased pressure resistance, in particular against external positive pressure, the housing (6) has a first housing shell and a second housing shell, the first housing shell and the second housing shell completely surrounding the measuring tube (2) so as to form at least a first pressure-resistant hollow space around the measuring tube (2), and the first housing shell and the second housing shell forming a bridge (13) between the inlet (10) and the outlet (11) of the measuring tube (2).

12 Claims, 4 Drawing Sheets

CORIOLIS MASS FLOWMETER

BACKGROUND OF THE INVENTION

1. Field of the Invention

The invention relates to a Coriolis mass flow meter having at least one curved measuring tube, at least one oscillation generator, at least one oscillation sensor, at least one measuring device electronics and a housing.

2. Description of Related Art

Coriolis mass flowmeters are known in the prior art in a variety of configurations. Mass flowmeters that operate according to the Coriolis principle usually have at least one oscillation generator, which excites the measuring tubes to oscillation as well as, often, two oscillation sensors with which the achieved oscillation or achieved oscillations of the measuring tubes are detected. The oscillation sensors are commonly fixed on the inlet and outlet sides of the measuring tubes. Without flow, the signals of the two oscillation sensors are essentially in-phase. With a mass flow, a different Coriolis force results on the inlet and outlet sides, which leads to a phase shift of the two signals of the oscillation sensor, wherein the phase shift is proportional to the mass flow rate within the measuring tube.

The oscillation generator and the oscillation sensor are usually constructed such that, for example, they have a permanent magnet and a magnet coil, in order to transmit oscillations by electrical means onto the measuring tubes or to detect oscillations of the measuring tubes.

Coriolis mass flowmeters having curved flow tubes, and having a housing that surrounds the measuring tube, are known. Such housings are, for example, formed as a sheet metal component with a separate supporting structure—often referred to as bridge—, on which the flow tubes are supported. To prevent damage to the housing from medium unintentionally escaping from the measuring tube, for example, via a leak, such housings, for example, have a pressure relief valve that reduces the pressure in the housing at a certain threshold value, thereby preventing damage to the housing. Such solutions are not suitable for use in which, for example, the escape of the measuring medium into the surroundings is to be prevented in all cases, and this applies, for example, to use in power stations.

Coriolis mass flowmeters known from the prior art have the disadvantage that it is possible for deformation of the housing or even destruction to occur, despite the excess pressure valve, especially for very high pressures, for example, of up to 300 bar. Also, in the opposite case of a significant pressure load from the outside, the prior art does not have housing solutions for high-pressure applications that are sufficiently stable.

SUMMARY OF THE INVENTION

A primary object of the present invention is, thus, to provide a Coriolis mass flowmeter having a housing with increased pressure resistance, particularly against external pressure.

The above object is initially and essentially achieved according to the present invention, in that the housing comprises a first housing shell and a second housing shell, that the first housing shell and the second housing shell completely surround the measuring tube, so that the first housing shell and the second housing shell form at least a first pressure-resistant hollow space around the measuring tube, and that the first housing shell and the second housing shell form a bridge between the inlet and the outlet of the measuring tube. The Coriolis mass flowmeter has at least one curved measuring tube extending between the inlet and the outlet and, for example, is bent into a U- or a V-shape. Preferably, the Coriolis mass flowmeter has at least two curved measuring tubes. The two measuring tubes advantageously extend between the inlet and the outlet of the flow tubes parallel to one another. On the inlet side and the outlet side, the flow tubes, for example, are connected individually or alternatively are combined in a collector, which can also be combined with a flange.

At least one oscillation generator and preferably two oscillation sensors are mounted onto the measuring tubes or the measuring tube by means of a holding device known from the prior art, so that the measuring tube can be excited to oscillation with the oscillation generator and the oscillations can be detected by oscillation sensors arranged on the inlet side and the outlet side. The housing, in which the measuring tube is arranged, comprises a first housing shell and a second housing shell, which are assembled to make the housing. Preferably, the housing comprises a first housing shell and second housing shell. The first and second housing shells surround the measuring tube completely between the inlet and outlet, so that the measuring tube extends beyond the housing indirectly or directly only at the outlet and the inlet. The measuring tube is accessible at the inlet and outlet so that it is directly or indirectly connectable to the piping system surrounding the Coriolis mass flowmeter.

The first housing shell and the second housing shell form at least one, first pressure-resistant hollow space around the measuring tube, so that, on the one hand, the measuring tube is protected from external positive pressure and, on the other hand, internal positive pressure, which can be caused, for example, by damage to the measuring tube, is absorbed by the housing without damage. A recess is provided, for example, at least in the first housing shell and/or at least in the second housing shell, which is formed by at least one part of the first pressure resistant hollow space. The first housing shell and the second housing shell are designed in such a manner for forming the first pressure resistant hollow space, that they can resist a very high internal pressure or a very high external pressure, for example, pressure in the order of 300 bar. The first housing shell and the second housing shell are, thus, preferably integrally formed.

In addition to the measuring tube or measuring tubes with the oscillation generator arranged thereon and the oscillation sensors, the measuring device electronics are preferably also arranged within the first pressure resistant hollow space, so that the measuring electronics are protected at least against external pressure. The connections of the measuring device electronics, for example, are led through the housing via a pressure-tight passage, in particular through the first housing shell and/or through the second housing shell.

Furthermore, it is provided that the first housing shell and the second housing shell form a bridge between the inlet and the outlet of the measuring tube. The bridge is also called, for example, a bar, and preferably extends as a solid cross section—solid bridge—between the inlet and the outlet of the measuring tube. The bridge is formed, for example, by solid areas or areas reinforced with struts of the first housing shell and/or the second housing shell, so that it is formed by the joining of the first and the second housing shell. The bridge stabilizes the housing and leads to the ends of the measuring tube on the inlet side and the outlet side being held in a fixed position relative to one another. A solid bridge minimizes the transmission of oscillations from the Coriolis mass flowmeter onto pipes surrounding the Coriolis mass flowmeter. In order to form the solid bridge, the first housing shell and/or the second housing shell, for example, are formed between the inlet and the outlet of the measuring tube, at least partially with an increased material strength in comparison to the rest of the housing. The bridge is advantageously wherein it is directly supported, namely a direct and straight supporting connection, between the connecting surfaces at the inlet and at the outlet.

In the assembled state, the first housing shell and the second housing shell are preferably provided with a circumferential weld seam which gives the housing additional stability. Optionally, a seal is arranged between the first housing shell and the second housing shell which ensures the pressure resistance of the first hollow space for very high pressures, provided that the housing shells are not welded together. The first and the second housing shell are made, in particular, from stainless steel, and for example, are machined from a solid material or made by molding, for example, casting, and subsequent post-processing.

A Coriolis mass flowmeter with such a housing is particularly suitable for use in areas where high external pressures act on the housing, for example, in very deep waters, as in oil or gas production. A stiffening of the housing and a compensating transfer of force between the inlet and the outlet is caused, in particular, due to the bridge, whereby the probability of deformation of the housing is minimized.

In order to simplify the assembly of the Coriolis mass flowmeter, it is provided, according to a first preferred design, that the first housing shell and the second housing shell are joined together in a joining plane, and that the joining plane runs parallel to a central plane formed by the measuring tube central axis. The measuring tube central axis of the U-shaped or V-shaped measuring tube spans the central plane, the joining plane of the first housing shell and the second housing shell running parallel thereto. It is preferably provided that, with two measuring tubes, the joining plane of the first housing shell and the second housing shell is arranged exactly in the middle between the central planes of the first and second measuring tubes. The measuring tube is arranged for assembling the Coriolis mass flowmeter, for example, together with the oscillation generator and the oscillation sensors and the measuring device electronics disposed in the second housing shell wherein, subsequently, the first housing shell acts as a cover. Finally, the first housing shell and the second housing shell are welded together with a welding seam that runs circumferentially in the joining plane.

The stability of the housing of the Coriolis mass flowmeter can be increased according to a next design, in that the contact surface between the first housing shell and second housing shell is about 20% to 60% of the area of the housing in cross-section in the joining plane. The joining plane is the plane in which the first housing shell and the second housing shell are joined together. The contact area is the area with which the first housing shell and the second housing shell are in direct contact to one another. In the broadest sense, the overall area in cross section in the joining plane minus the recesses present for the first pressure-resistant hollow space in the first housing shell and/or in the second housing shell. The stability of the housing of the Coriolis mass flow meter is increased by a large as possible contact area between the first housing shell and the second housing shell, since this goes hand in hand with increasing the wall thickness of the first housing shell and/or the second housing shell, at least in the joining plane. Most preferably, the contact area between the first housing shell and the second housing shell is about 35%. The larger the contact area, the smaller the first pressure-resistant hollow space in relation to the overall area of the housing in cross-section in the joining plane.

In order to prevent, for example, that the measuring device electronics are damaged by medium escaping from the measuring tube, it is provided according to a further design that the first housing shell and the second housing shell form a second pressure-resistant hollow space, in particular, the measuring device electronics are arranged in the second hollow space. The first housing shell and/or the second housing shell have at least one further recess, which forms, in addition to the first pressure-resistant hollow space, a second pressure-resistant hollow space inside the housing in the assembled state. Preferably, the first hollow space is completely closed off from the second hollow space, wherein only a fluid- and pressure-resistant passage is provided for the connecting lines of the oscillation generator and the oscillation sensors as well as for any additionally required connection lines. The second hollow space is preferably provided in the clearance of the U- or V-shaped, bent measuring tube. The size of the second hollow space essentially corresponds to the size required for the measuring device electronics. Such a design has the advantage that the measuring tube is separate from the measuring device electronics of the housing, namely encapsulated, in particular, by the first housing shell and the second housing shell.

The pressure resistance of the housing can be increased according to a next design, in that the first hollow space and/or the second hollow space has/have a minimum size, in particular, that the first hollow space and/or the second hollow space tightly encloses the measuring tube and/or the measuring device electronics. The first hollow space and/or the second hollow space consequently have a size which is just sufficient or necessary for permitting the measuring tube to oscillate or to mount the measuring device electronics. The smaller the first hollow space and/or the second hollow space are formed, the greater the contact area between the first housing shell and the second housing shell, wherein this further increases the pressure resistance of the housing. The measuring tube is tightly enclosed by the first hollow space in such a manner that oscillation of the measuring tube is made possible, but no unnecessary space is provided around the measuring tube.

The joining of the housing of the Coriolis mass flowmeter is simplified according to a further design in that the first housing shell and the second housing shell are at least partially connected in a form-locking manner, in particular that at least one bolt is provided between the first housing shell and the second housing shell. Preferably, at least three, in particular at least four bolts are provided between the first housing shell and the second housing shell. In order to mount the bolts, for example, a number of blind holes, into which the bolts are inserted, corresponding to the number of bolts, is provided in the first housing shell and/or in the second housing shell. Thus, the bolts are used for positioning the first housing shell relative to the second housing shell and lead to stabilization of the housing. Preferably, it is also provided that the bolts are screwable at least to one side, so that the bolt can be screwed, for example, into the first housing shell or into the second housing shell, wherein only plugging occurs in the respective other housing shell. The bolts are provided, preferably, in the contact area between the first housing shell and second housing shell.

In particular, in order to prevent deformation of the housing under the influence of pressure in the area around the first hollow space and/or the second hollow space, it is provided according to a further design that the first housing shell and the second housing shell are connected to one another with at least one screw bolt, in particular, that the screw bolt is screwed to both the first housing shell and the second housing shell. The bolt is preferably arranged in the area of the first hollow space and/or the second hollow space, wherein the housing shells mutually support one another in that the bolt is connected to both the first housing shell and the second housing shell. Especially in the case of external pressure on the housing, mutual support occurs via the bolt, wherein, in particular, at least two symmetrically arranged bolts are provided. The bolt preferably has a thread on each of its end regions, so that it can be screwed into the first housing shell and the second housing shell via bores having an internal thread, preferably into bores that are arranged orthogonally to the joining plane. Using opposing threads, namely a left-hand thread on one end and a right-hand thread on the other end, the bolt can be screwed into the first housing shell and the second housing shell at the same time, wherein by tightening the bolt, a tensile force is preferably caused between the first housing shell and the second housing shell.

For maintenance and installation purposes, it is provided in a further design that at least one opening is provided at least in the first housing shell and/or at least in the second housing shell and that at least one oscillation generator and/or at least one oscillation sensor is accessible through the opening, it is preferable that the opening is arranged orthogonally to the plane E formed by the measuring tube central axis. In order to mount or exchange the oscillation generator and/or the oscillation sensors, for example, in the assembled housing of the Coriolis mass flowmeter, in particular in first and second housing halves that are welded together, at least one opening is provided in the first half of the housing and/or in the second half of the housing that is closable with a screw, in particular a headless screw. For this purpose, the opening has inner threading. The opening is provided in such a manner in the first housing shell or in the second housing shell that it is arranged precisely such that the oscillation generator and/or the oscillation sensor are accessible. Preferably, a separate opening is provided for each oscillation sensor and each oscillation generator.

The production of the Coriolis mass flowmeter can be advantageously simplified according to a further design in that the first housing shell and the second housing shell are formed identically with respect to their basic shape. The first housing shell and the second housing shell can, consequently, be produced as identical components with respect to their basic shape, wherein, subsequently, different holes are only provided for fixing or for making the openings.

A bridge with a preferred cross-section can be obtained according to a further design in that the bridge at least partially extends into the region of an imaginary direct line between the inlet and the outlet of the measuring tube. If the measuring tube is curved, an imaginary direct line can be devised between the inlet and the outlet of the measuring tube, which represents the shortest—imaginary—connection between the inlet and the outlet. The cross section of the bridge can be increased in that the bridge extends at least partially into the region of the imaginary connecting line, thus overlapping the imaginary connecting line.

The stability of the housing of the Coriolis mass flowmeter can also be increased according to a further design, in that the wall thickness limiting the hollow space is at least partially greater in the joining plane in the area of the bridge than in other areas of the first housing shell and or the second housing shell. The wall thickness of the first housing shell and/or the second housing shell located in the joining plane is meant by the wall thickness. This wall thickness in the area of the bridge at least partially exceeds the greatest wall thickness of the housing in the other regions.

The pressure resistance of the housing can also be further increased in that the minimum wall thickness of the housing corresponds to approximately twice the measuring tube diameter. The minimum wall thickness, i.e., the thinnest part of the first housing shell and/or the second housing shell, thus corresponds to at least twice the measuring tube diameter, thus ensuring that the housing has sufficient pressure resistance.

The stability of the housing against high external or internal pressure can be further increased according to a last design in that at least the first housing shell and/or at least the second housing shell has at least one reinforcing rib, and in particular, in that the reinforcing rib is disposed on an outer surface. The reinforcing rib, for example, is integrally formed with the first housing shell and/or the second housing shell or added subsequently, for example, by material bonding, in particular welding, to the first housing shell and/or the second housing shell. Depending on the use of the Coriolis mass flowmeter, the at least one reinforcing rib, preferably several reinforcing ribs, is/are arranged on an inner surface or an outer surface of the housing. Preferably, the reinforcing rib is disposed on an outer surface of the first housing shell and/or the second housing shell, so that the housing advantageously withstands external pressure. In that the reinforcing rib is located outside the housing, space can be saved within the housing, wherein the hollow space or hollow spaces can be reduced to a low volume. It has been seen to be of particular advantage, when two reinforcing ribs are arranged parallel.

Coriolis mass flowmeters designed according to the invention and housings for mass flowmeters designed according to the invention allow for the use of flowmeters in the high-pressure range. This can—with external pressure—for example, be deep-sea use, or this can—with high internal pressure—for example, be use in the power plant sector, where there is often the need for a secondary containment.

In particular, there are now a variety of possibilities for designing and further developing the Coriolis mass flowmeter, as will be apparent from the following description of preferred embodiments, in conjunction with the accompanying drawings.

DETAILED DESCRIPTION OF THE INVENTION

Figure 1:
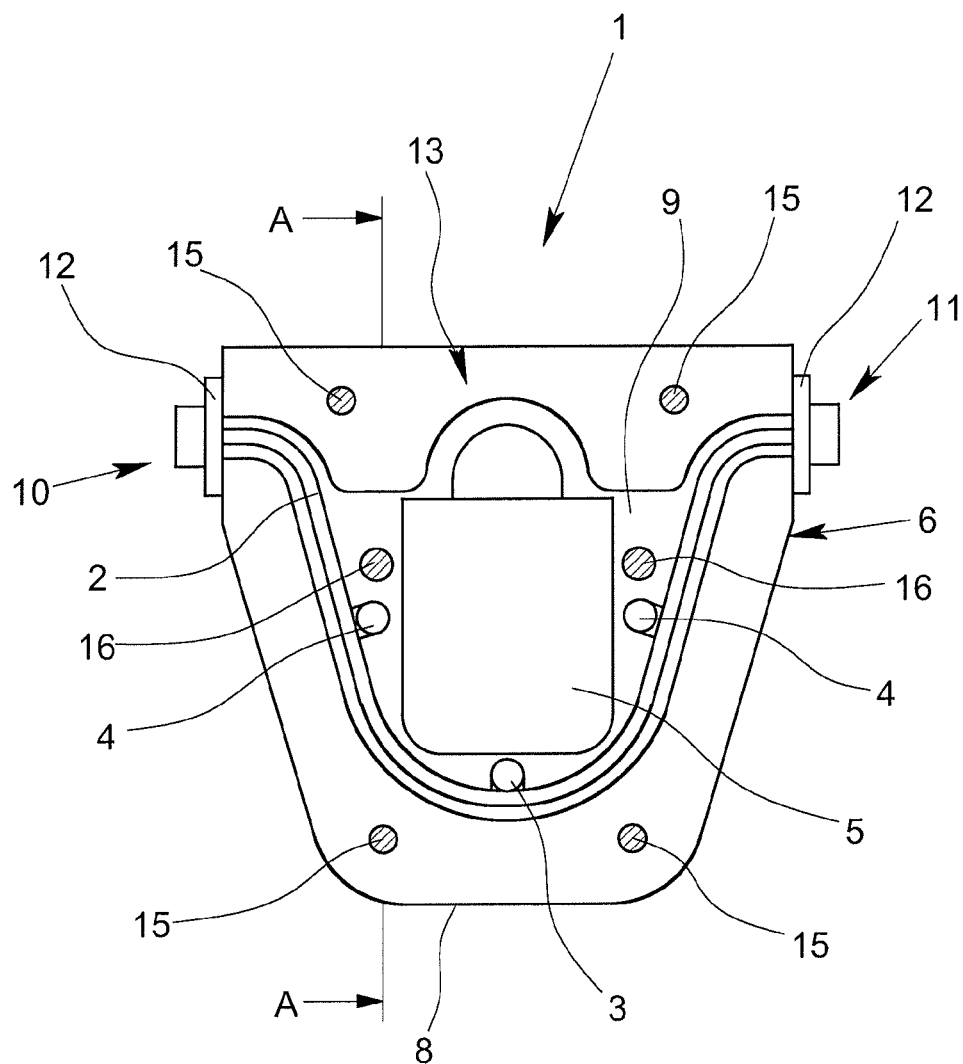
FIG. 1 shows an embodiment of a Coriolis mass flowmeter in the open state.
Figure 3:
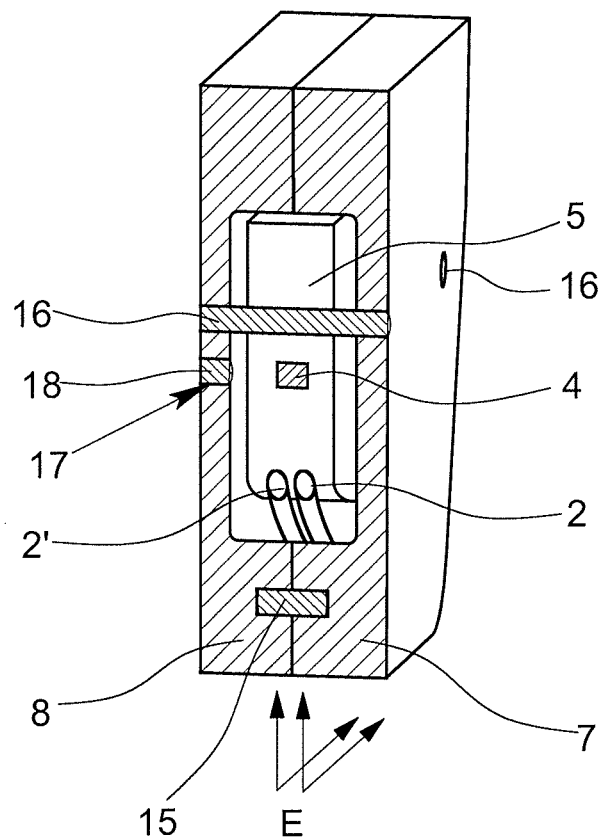
FIG. 3 is a sectional view of the embodiment of a Coriolis mass flowmeter taken along line A-A in FIG. 1.

FIG. 1 shows an embodiment of a Coriolis mass flowmeter 1 in the open state. The Coriolis mass flowmeter 1 includes a first curved measuring tube 2 and a second curved measuring tube 2', wherein the second measuring tube 2', for example, is shown in FIG. 3. The Coriolis mass flow meter 1 includes an oscillation generator 3 and two oscillation sensors 4, which are at least partially attached to the measuring tube 2 or the measuring tube 2'. The Coriolis mass flow meter 1 further includes measuring device electronics 5, which are located between the curves of the measuring tube 2, 2', for evaluating the measured data.

Figure 2:
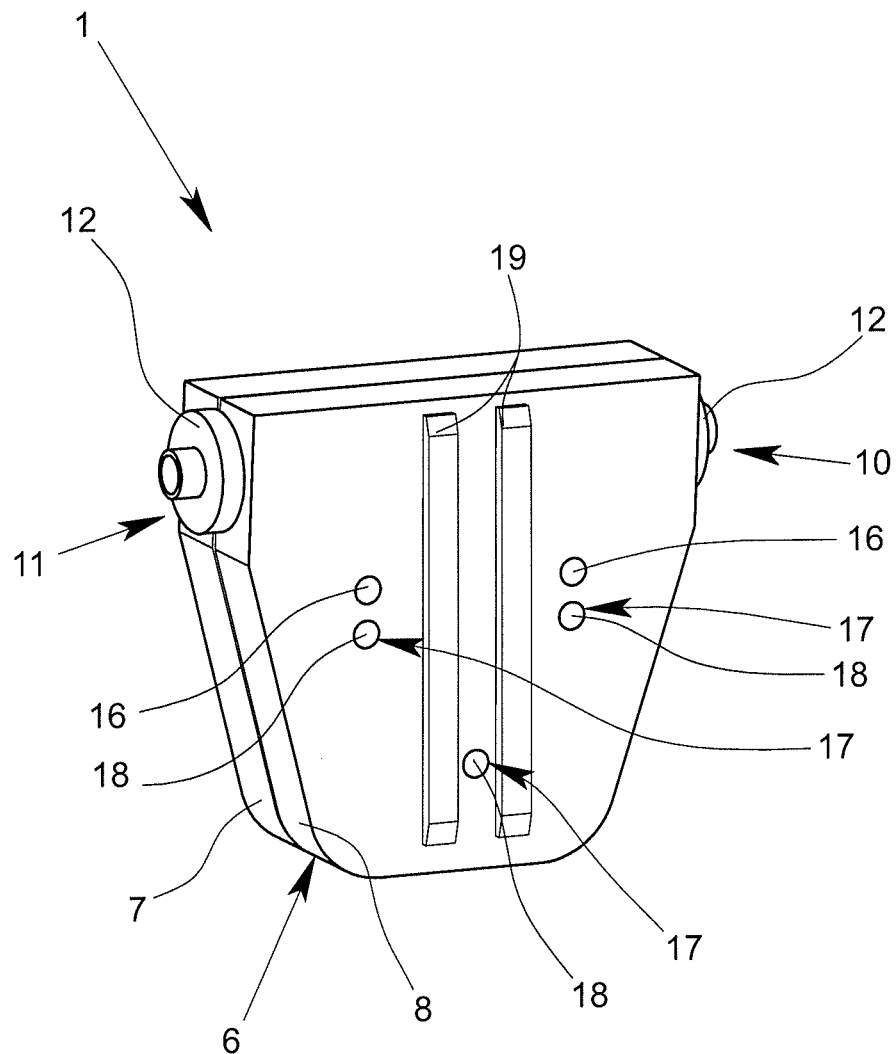
FIG. 2 shows the embodiment of a Coriolis mass flowmeter of FIG. 1 in the closed state.

The housing 6 of the Coriolis mass flowmeter 1 comprises—as shown in FIGS. 2 & 3—a first housing shell 7 and a second housing shell 8. The first housing shell 7 and the second housing shell 8, together, completely surround the measuring tube 2 and also the measuring tube 2', so that a first pressure-resistant hollow space 9 is formed around the measuring tubes 2, 2' by the first housing shell 7 and the second housing shell 8 (see, FIG. 1). In addition to the measuring tubes 2, 2', the measuring device electronics 5 are arranged in the hollow space 9. The first housing shell 7 and the second housing shell 8 have recesses, which form the hollow space 9.

As can be seen from FIG. 1, the first housing shell 7 and the second housing shell 8 form a solid bridge 13 between the inlet 10 and the outlet 11 of the measuring tubes 2, 2'. A flange 12 is provided for the inlet 10 and outlet 11 of the measuring tubes 2, 2', which is used in this embodiment, for example, as a collector. The flanges 12 are screwed both to the first housing shell 7 and to the second housing shell 8 in the assembled state. The first housing shell 7 and the second housing shell 8 each have a flat contact surface for the flanges 12 at the inlet 10 and the outlet 11. The bridge 13 implements a direct connection of the two contact surfaces at the inlet 10 and at the outlet 11 so that there is no continuous hollow space in the direct connecting line between the two contact surfaces in the area of the passage of the measuring tube between the contact surfaces.

FIG. 2 shows the embodiment according to FIG. 1 in the assembled state, wherein the first housing shell 7 and the second housing shell 8 are joined together to form the housing 6 in the joining plane. The joining plane of the first housing shell 7 and the second housing shell 8 is arranged parallel to the planes E formed by the respective measuring tube central axes of the measuring tubes 2, 2'—see FIG. 3. In the present case—according to FIGS. 1 to 3—the joining plane lies exactly in the middle between the planes E formed by the central axes of measuring tubes 2, 2'.

As can be seen FIG. 1, the contact surface between the first housing shell 7 and second housing shell 8 corresponds, in the mounted state, to about 35% of the total area of the housing 6 in cross-section in the joining plane. FIG. 1 shows the housing 6 in the open state so that the contact surfaces of the shown second housing shell 8 are visible. The contact surfaces are all surfaces in the cross section of the second housing shell 8 in the joining plane that are not provided with a recess for the hollow space 9.

Figure 4:
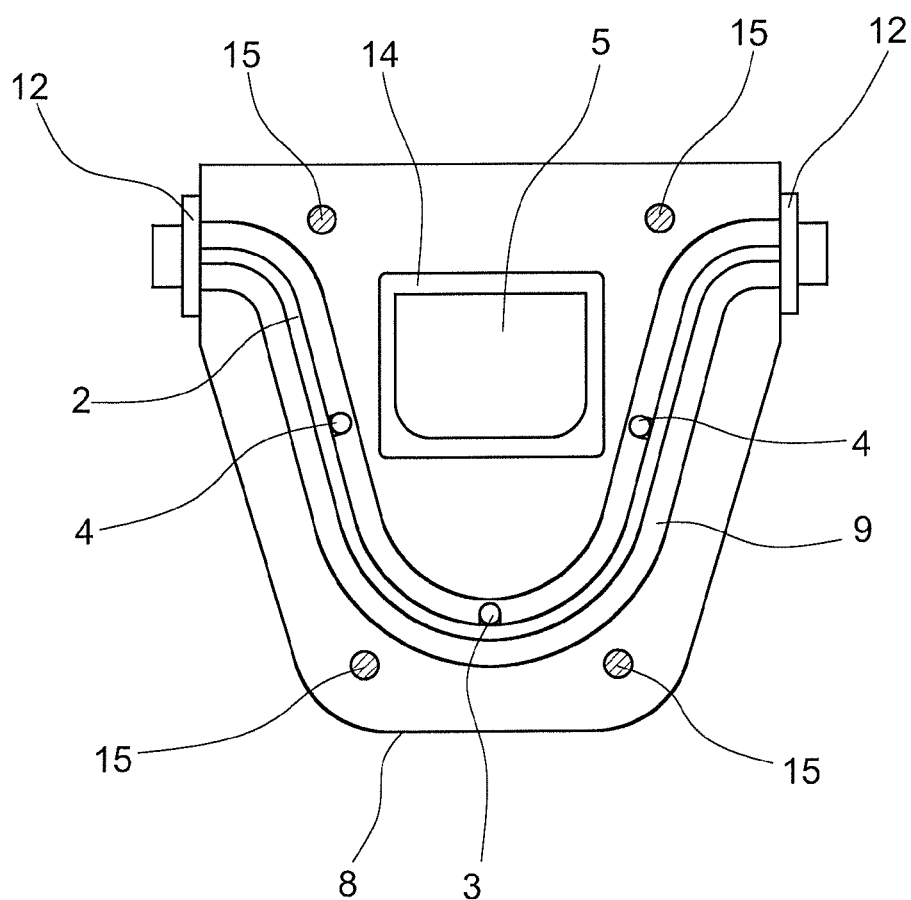
FIG. 4 shows another embodiment of a Coriolis mass flowmeter.

FIG. 4 shows an embodiment of a Coriolis mass flowmeter 1 with a measuring tube 2, wherein an oscillation generator 3 and an oscillation sensor 4 are at least partially attached to the measuring tube 2. The measuring tube 2 runs between the inlet 10 and the outlet 11 in a first pressure-resistant hollow space 9. A flange 12 is provided at each inlet 10 and outlet 11 on the measuring tube 2, the flange 12 being secured to the housing 6, namely to the first housing shell 7 and the second housing shell 8. The measuring device electronics 5 are arranged in a second pressure-resistant hollow space 14 which, in this embodiment, is independent of the first pressure-resistant hollow space 9, so that, for example, in case of damage of the measuring tube 2, no medium can come into contact with the measuring device electronics 5. The first hollow space 9 as well as the second hollow space 14 have a minimum size, namely such that the measuring device electronics 5 are mounted in the second hollow space 14 and the measuring tube 2 is assembled in the first hollow space, wherein, then, oscillation of the measuring tube is made possible. FIG. 4 shows the Coriolis mass flowmeter 1 in the open state, so that only the second housing shell 8 is shown.

FIG. 3 shows the embodiment of a Coriolis mass flow meter according to FIG. 1 in section along the line A-A in FIG. 1. The first housing shell 7 and the second housing shell 8 are positively connected to each other in that four bolts 15 are inserted in blind holes in the first housing shell 7 and the second housing shell 8. The bolts 15 are used, inter alia, for positioning the first housing shell 7 relative to the second housing shell 8. Furthermore, the first housing shell 7 and the second housing shell 8 are connected to one another with two continuous screw bolts 16, which have a thread on each of their end sections. The thread acts together with corresponding threads in the first housing shell 7 and the second housing shell 8 so that the first housing shell 7 and the second housing shells 8 are screwed to one another with the two screw bolts 16. A transmission of force occurs via the screw bolt 16 in the mounted state between first housing shell 7 and second housing shell 8, which contributes to a higher resistance of the housing 6 against external pressure, in particular against pressure in the order of about 300 bar. The cut part of an oscillation sensor 4 is illustrated above the cut, illustrated measuring tubes 2 and 2'.

In the assembled state, the oscillation sensors 4 are accessible through openings 17 in the second housing shell 8, which are closed with a headless screw 18. The headless screw 18 is screwed into each of the openings 17 via threading. As can be seen in FIG. 2, an opening 17 is also provided for the oscillation generator 3. The openings 17 are disposed orthogonal to the planes E formed by the measuring tube central axes. The planes E are shown schematically.

In all the embodiments shown in FIGS. 1 to 4, the first housing shell 7 and the second housing shell 8 are formed identical in their basic shape. Furthermore, the bridge 13 extends, as seen for example, in FIGS. 1 & 4, at least partially into the region of an imaginary, direct connecting line between the inlet 10 and the outlet 11 of the measuring tube. It is also apparent from FIGS. 1 & 4 that the wall thickness defining the hollow space 9 and the hollow space 14 is greater at least in part in the joining plane in the area of the bridge 13 than in the other regions of the first housing shell 7 and the second housing shell 8. Furthermore, in particular, it can be seen in FIG. 3 that the minimum wall thickness of the housing 6 corresponds to about twice the measuring tube diameter of the measuring tube 2, 2'.

FIG. 2 shows that two reinforcing ribs 19 are arranged on the outer surface of the second housing shell 8, namely, in particular, the second housing shell 8 in the region of the hollow space 9. The ribs contribute to an increased pressure resistance of the housing 6, particularly against external pressure.

What is claimed is:

1. Coriolis mass flowmeter, comprising:
   at least one curved measuring tube having an inlet and an outlet,
   at least one oscillation generator arranged for vibrating said at least one curved measuring tube,
   at least one oscillation sensor arranged for detecting vibration said of at least one curved measuring tube,
   at least one measuring device electronics for measuring vibration detected by said at least one oscillation sensor, and
   a housing enclosing at least said at least one curved measuring tube,
   wherein the housing comprises a first housing shell and a second housing shell,
   wherein the first housing shell and the second housing shell completely surround the at least one curved measuring tube in a manner forming at least a first pressure-resistant hollow space around at least the at least one curved measuring tube,
   wherein the first housing shell and the second housing shell are joined together at a joining plane that runs parallel to a plane formed by a central measuring tube axis, wherein the first housing shell and the second housing shell together form a bridge between the inlet and the outlet of the at least one curved measuring tube, and wherein the bridge forms a solid region that extends in said joining plane both across the housing between the inlet and outlet of the measuring tube and at least partially into a region of an imaginary direct connection line between the inlet and outlet of the measuring tube.

2. Coriolis mass flowmeter according to claim 1, wherein a contact surface between the first housing shell and second housing shell has an area that is approximately 20% to 60% of a cross-sectional area of the housing in the joining plane.

3. Coriolis mass flowmeter according to claim 1, wherein the first housing shell and the second housing shell form a second, pressure-resistant hollow space in which the measuring device electronics is located.

4. Coriolis mass flowmeter according to claim 3, wherein the second hollow space tightly surrounds the measuring device electronics.

5. Coriolis mass flowmeter according to claim 1, wherein the first housing shell and the second housing shell are at least partially connected in a form-locking manner.

6. Coriolis mass flowmeter according to claim 1, wherein the first housing shell and the second housing shell are at least partially connected by at least one bolt provided extending between the first housing shell and second housing shell.

7. Coriolis mass flowmeter according to claim 6, wherein the at least one bolt comprises at least one screw bolt that is screwed into both with the first housing shell and with the second housing shell.

8. Coriolis mass flowmeter according to claim 1, wherein at least one opening is provided in at least one of the first housing shell and the second housing shell, and wherein at least one of the at least one oscillation generator and the at least one oscillation sensor is accessible through said at least one opening, the at least one opening being arranged orthogonal to the central measuring tube axis.

9. Coriolis mass flowmeter according to claim 1, wherein the first housing shell and the second housing shell have an identical basic shape.

10. Coriolis mass flowmeter according to claim 1, wherein at least one of the first and second housing shells has a wall thickness in portions thereof in the joining plane defining the at least one hollow space in the region of the bridge that is at least partially greater than in other areas of said at least one of the first and second housing shells.

11. Coriolis mass flowmeter according to claim 1, wherein the housing has a minimum wall thickness that is approximately twice the internal diameter of the at least one curved measuring tube.

12. Coriolis mass flowmeter according to claim 1, wherein at least one of the first housing shell and the second housing shell has at least one reinforcing rib arranged on an outer surface thereof.

* * * * *